(12) United States Patent
DiMambro

(10) Patent No.: US 8,134,801 B2
(45) Date of Patent: Mar. 13, 2012

(54) ELECTROMAGNETIC DATA STORAGE DEVICES

(76) Inventor: Bryan DiMambro, Oklahoma City, OK (US)

( * ) Notice: Subject to any disclaimer, the term of this patent is extended or adjusted under 35 U.S.C. 154(b) by 999 days.

(21) Appl. No.: 12/077,484

(22) Filed: Mar. 19, 2008

(65) Prior Publication Data

US 2008/0239566 A1    Oct. 2, 2008

Related U.S. Application Data

(60) Provisional application No. 60/918,893, filed on Mar. 19, 2007.

(51) Int. Cl.
*G11B 5/127* (2006.01)

(52) U.S. Cl. .................... 360/110; 360/125.01
(58) Field of Classification Search .............. 360/110, 360/111, 123.01, 125.01
See application file for complete search history.

(56) References Cited

U.S. PATENT DOCUMENTS

| | | | | |
|---|---|---|---|---|
| 2,679,025 A | * | 5/1954 | Rajchman et al. | 324/211 |
| 2,835,743 A | * | 5/1958 | Muffley | 360/63 |
| 2,905,770 A | * | 9/1959 | Kornei | 360/111 |
| 3,150,358 A | * | 9/1964 | Newman et al. | 360/26 |
| 3,591,733 A | * | 7/1971 | Pflughaupt | 360/123.01 |
| 3,639,698 A | * | 2/1972 | Uemura et al. | 360/121 |
| 3,706,926 A | * | 12/1972 | Barrager et al. | 324/210 |
| 3,713,122 A | * | 1/1973 | Taylor | 360/121 |
| 3,789,156 A | * | 1/1974 | Bessette | 360/123.01 |
| 3,816,908 A | * | 6/1974 | Fujimura et al. | 29/603.16 |
| 3,829,894 A | * | 8/1974 | Watanabe et al. | 360/111 |
| 3,881,193 A | * | 4/1975 | Fujimura et al. | 360/123.01 |
| 3,881,194 A | * | 4/1975 | Heaslett et al. | 360/123.01 |
| 4,091,429 A | * | 5/1978 | de Jonge et al. | 360/110 |
| 4,423,450 A | * | 12/1983 | Hamilton | 360/111 |
| 5,063,467 A | * | 11/1991 | Colineau et al. | 360/119.01 |
| 5,093,980 A | * | 3/1992 | Maurice et al. | 29/603.13 |
| 6,025,976 A | * | 2/2000 | Marlowe | 360/110 |
| 6,295,175 B1 | * | 9/2001 | Tomita et al. | 360/31 |
| 7,486,478 B2 | * | 2/2009 | Lim et al. | 360/125.01 |
| 2008/0024910 A1 | * | 1/2008 | Seigler | 360/110 |

FOREIGN PATENT DOCUMENTS

JP    08288567 A    * 11/1996

* cited by examiner

*Primary Examiner* — Will J Klimowicz
(74) *Attorney, Agent, or Firm* — Olson & Cepuritis, Ltd.

(57) ABSTRACT

A magnetic recording and reading device, free from coil windings, includes a naturally magnetic material that defines a pair of opposite magnetic poles and defines a magnetic field. A conductor in operable association with an integrated circuit array provided at each of the magnetic poles controls direction and flow of current in the conductors.

2 Claims, 4 Drawing Sheets

ELECTROMAGNETIC DATA STORAGE DEVICES

CROSS-REFERENCE TO RELATED APPLICATION

This application claims the benefit of U.S. Provisional Application No. 60/918,893, filed on Mar. 19, 2007, which is incorporated herein by reference.

FIELD OF INVENTION

This invention relates to electromagnetic data storage devices and to write/read heads for such devices.

SUMMARY OF INVENTION

A magnetic recording and reading device is free from coil windings and includes a naturally magnetic material that defines a pair of opposite magnetic poles generating a magnetic field. A conductor is provided at each of the magnetic poles. An integrated circuit array is operably associated with the conductors for controlling the direction and flow of current in the conductors.

The present recording and reading devices are useful components in electronic data storage devices.

DETAILED DESCRIPTION OF THE PREFERRED EMBODIMENT

Figure 1:
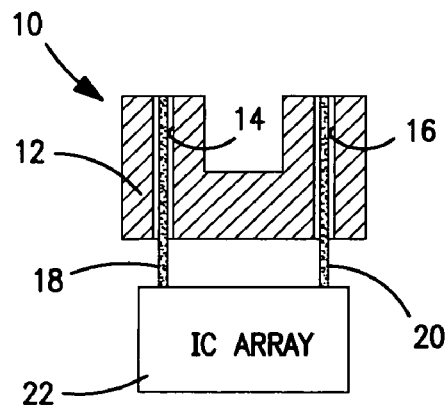
FIG. 1 is a schematic side view of a write/read head embodying the present invention.
Figure 2:
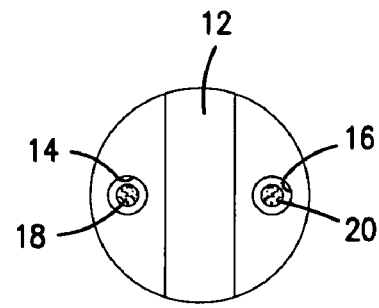
FIG. 2 is a top view of the write/read head of FIG. 1.

Referring to FIGS. 1 and 2, write or read head 10 comprises a horseshoe or U-shaped natural magnet that generates a magnetic field. Apertures 14 and 16 are provided at each of the magnetic poles of magnet 12. Conductors 18 and 20 pass through apertures 14 and 16, respectively, and are operably connected to a integrated circuit (IC) array 22 which controls current flow through the magnet 12. In use, the poles of magnet 12 are positioned in front of, but spaced from, a conductive media material that can hold a magnetic charge. That is, an air gap is provided between the magnetic poles of magnet 12 and the conductive material. A positive magnetic impression made on the conductive material constitutes a logical 1 and a negative impression on the magnetic material constitutes a logical 0.

For a read head the overall configuration is the same as that for a write head, but the magnetic field generated by the natural magnet is weaker than the magnetic field of the conductive material from which information is to be obtained. An IC array is operably associated with the read head to detect a change in the relatively weak current that is induced by a conductive material moving past the read head and the magnetic poles of the magnet in this manner. This current will then change direction in response to a relatively stronger magnetic field and the IC array will record a logical 1 or a logical 0 depending upon the imprinted value on the conductive material.

Figure 3:
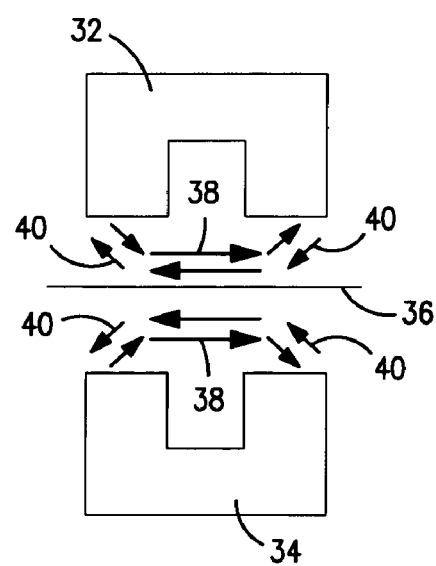
FIG. 3 is a schematic representation of a write head and read head combination with media situated therebetween.

As shown in FIG. 3, write head 32 is juxtaposed relative to read head 34 with conductive material or media 36 situated therebetween. Positive current flow, indicative of logical 1, is shown by arrow series 38 and negative current flow indicative of logical 0 is shown by arrow series 40.

Figure 4:
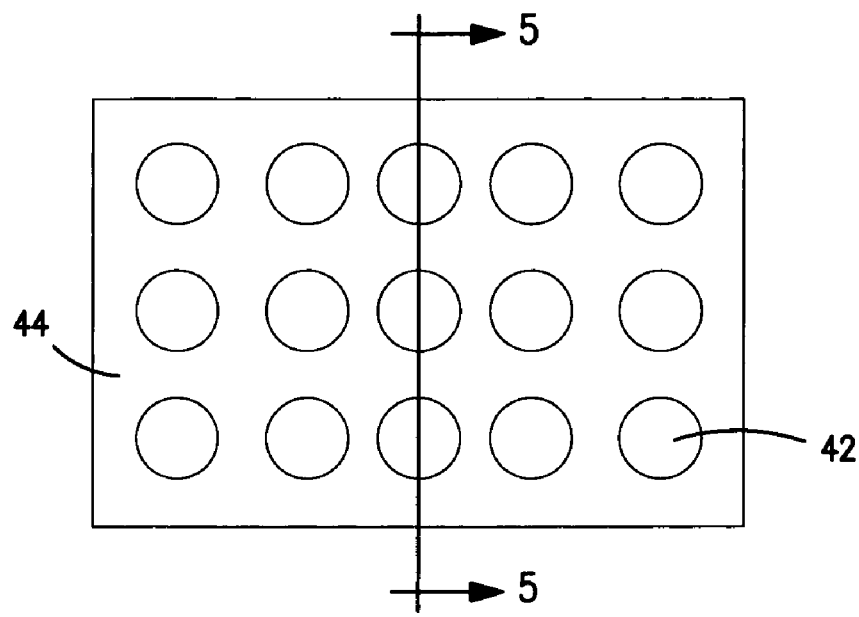
FIG. 4 is a plan view of a media assembly for a solid state device utilizing present write/read heads.
Figure 5:
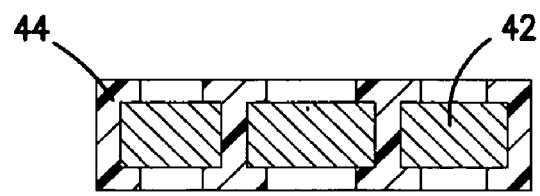
FIG. 5 is a sectional view of the media assembly shown in FIG. 4 taken along plane 5-5.

A suitable conductive material or media for use with the write/read heads of the present invention is shown in FIGS. 4 and 5. A planar array of conductive material 42 is surrounded by an insulating material 44. Conductive material 42 is recessed in the insulating material on both sides to provide space, i.e., an air gap, between the write/read heads and the conductive media when in use.

Figure 6:
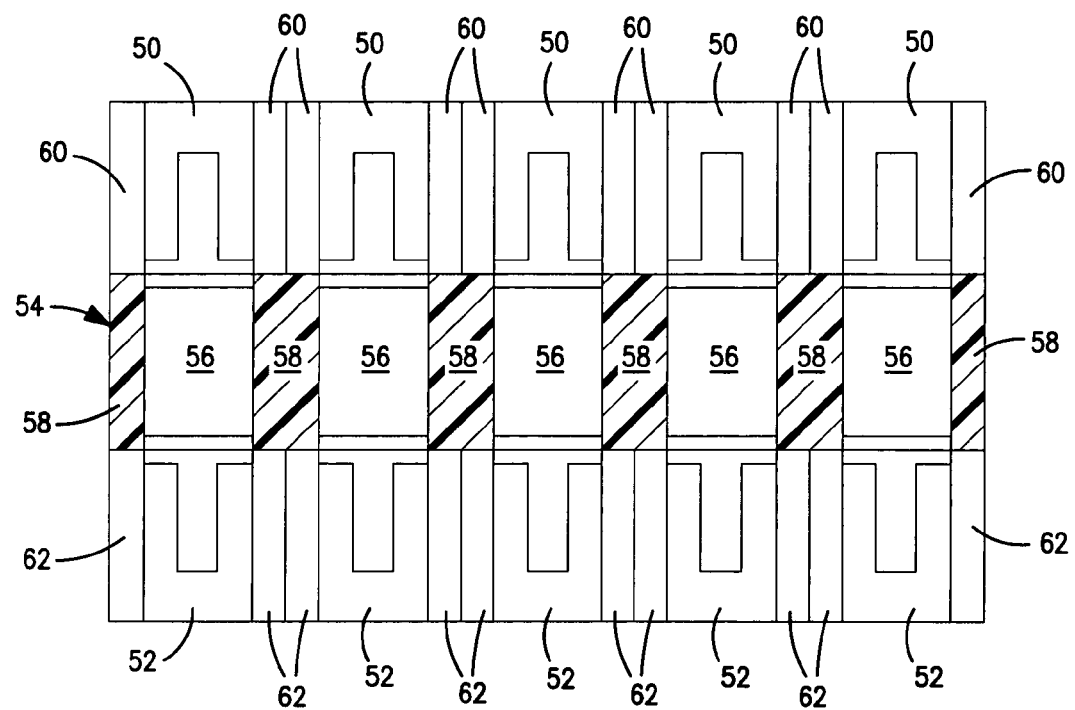
FIG. 6 is a schematic side view of a head and media assembly utilizing the write/read heads embodying the present invention.

FIG. 6 shows a head and media assembly with plural write heads 50 juxtaposed relative to read heads 52, and with a planar media wafer 54 sandwiched therebetween. Wafer 54 comprises conductive material 56 and insulating material 58. Write heads 50 are separated from one another by insulation 60. Read heads 52 are separated from one another by insulation 62.

Figure 7:
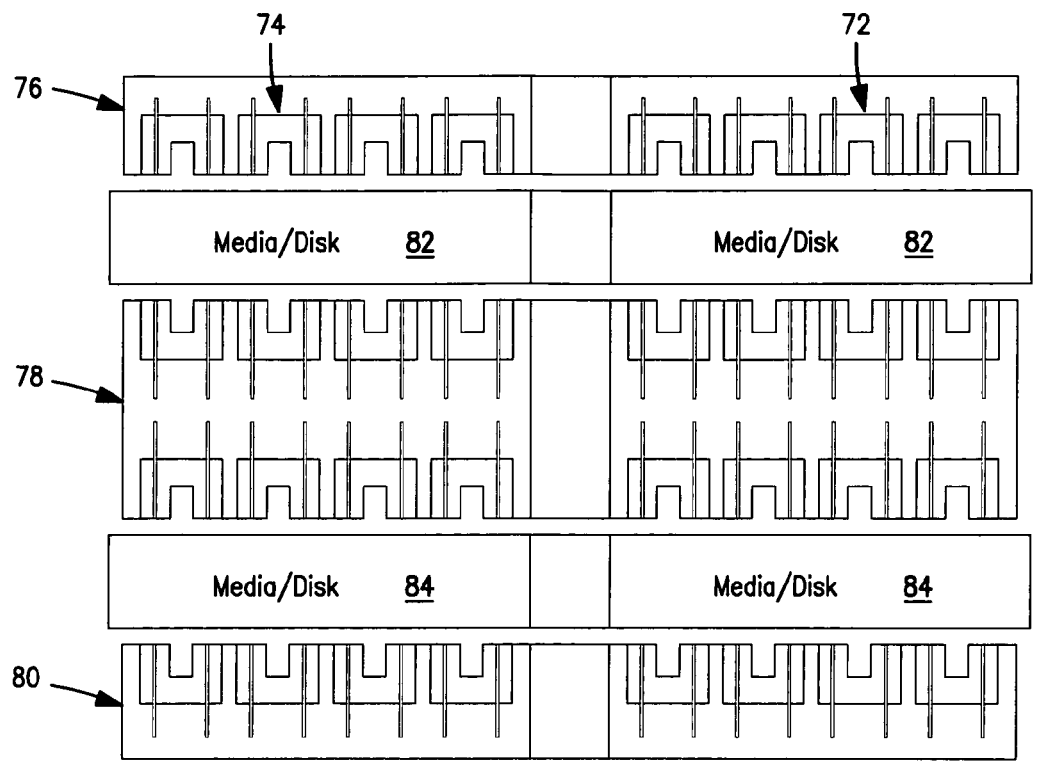
FIG. 7 illustrates use of the write/read heads embodying the present invention in a conventional hard drive.
Figure 8:
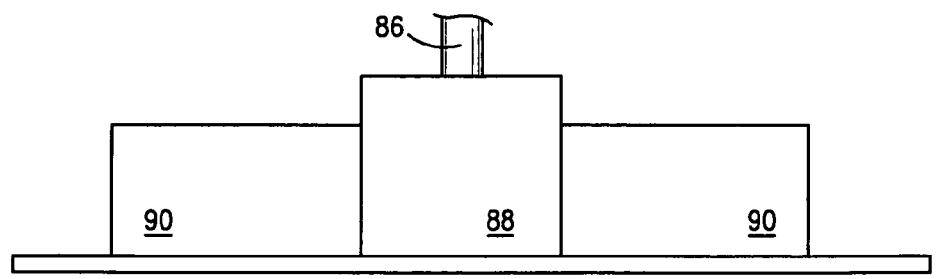
FIG. 8 is a schematic illustration of a drive arrangement for the hard drive assembly shown in FIG. 7.

FIGS. 7 and 8 illustrates use of present write and read heads in a conventional hard drive assembly. Arrays of write heads 72 and read heads 74 are incorporated into a cylinder with cards 76, 78 and 80 and media discs 82 and 84. The shown assembly is then mounted to a spindle 86 (FIG. 8) driven by spindle motor 88. Optional cooling system 90 can be provided, if desired, to minimize the likelihood of overheating.

The foregoing description and the drawings are illustrative and are not to be taken as limiting. Still other variations and rearrangements of parts are possible without departing from the spirit and scope of the present invention and will readily present themselves to those skilled in the art.

I claim:

1. A magnetic recording and reading device, free from coil windings, which comprises a naturally magnetic material defining a pair of opposing magnetic poles that generate a magnetic field, a conductor in each of said pair of magnetic poles, and an integrated circuit array in operable association with said conductors for controlling current direction and flow in the conductors wherein each conductor extends through an aperture in the respective magnetic poles of the naturally magnetic material in a direction substantially perpendicular to an end face of the naturally magnetic material, the end face configured to interface with a conductive media material capable of holding a magnetic charge.

2. An electromagnetic data storage device that includes at least one magnetic recording and reading device in accordance with claim 1.

* * * * *